Patented Dec. 11, 1951

2,577,739

UNITED STATES PATENT OFFICE 2,577,739

PURIFICATION OF COBALT SULFATE SOLUTION

Ruth E. Churchward, Boulder City, Nev., and Francis K. Shelton, Kutch, Colo., assignors to the United States of America as represented by the Secretary of the Interior No Drawing. Application January 27, 1949, Serial No. 73,212

1 Claim. (Cl. 23—117)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the Act of April 30, 1928 (Ch. 460, 45 Stat. L. 467).

This invention relates to the purification of cobalt sulphate solution manganese, and particularly to the production of purified cobalt compounds low in manganese from mixtures containing manganese. More particularly, this invention relates to the production of cobalt sulfate suitable for cobalt metal electrowinning purposes from impure solutions of cobalt sulfate contaminated with substantial proportions of manganese sulfate.

In the cobalt electrowinning art, a substantial source of cobalt comprises the cobaltiferous manganese ores found, for example, in deposits in the southeastern United States. These ores contain from about 0.1 to 12.0 percent cobalt, based on manganese content, although the percentage of cobalt in the ore varies greatly. In the preparation for the recovery of manganese by electrowinning procedures, the cobalt is generally separated in the form of sulfide contaminated with substantial proportions of manganese. In order to utilize the contaminated cobalt, it is thus necessary to remove the manganese as completely as possible. Heretofore, the procedures for the separation of cobalt salts from manganese salts have been extremely tedious but a simple and convenient way to accomplish this result has now been devised in accordance herewith.

This invention, therefore, has for an object the separation of cobalt and manganese. Another object is to provide a process for the removal of minor proportions of manganese sulfate from cobalt sulfate. A further object is to provide a cyclic process in the cobalt electrowinning art whereby the anode sludge of the cobalt electrowinning cell is employed to remove manganese from the cobalt electrolyte, while at the same time recovering the cobalt values of such sludge for recirculation to the cobalt electrowinning cell. Further objects will be apparent or will appear hereinafter as the ensuing description proceeds.

In accordance with this invention, there is produced a cobalt salt, low in manganese, from a mixture of a cobalt salt with a manganese salt by treating an aqueous solution of such a mixture with an oxidizing agent capable of converting the manganese salt to insoluble manganese dioxide, but incapable of forming soluble permanganates under the treatment conditions. It will be seen that this invention takes advantage of the insolubility of certain manganese compounds, under the acidic conditions normally found in cobalt electrowinning solutions, by means of the selective conversion of soluble manganese sulfate into insoluble manganese dioxide or hydrates thereof. Obviously, in the employment of an oxidizing agent in accordance with this invention, it is not desirable that the oxidizing agent be present under conditions whereby the manganese sulfate becomes completely oxidized to the permanganate form, since this is similarly soluble in the cobalt electrowinning solution.

In one preferred embodiment, this invention contemplates the treatment of the manganese-containing cobalt solution with the sludge deposited at the anode during a cobalt electrowinning cycle. While it is not intended to be bound by any particular theory of reaction, present information indicates that cobalt anode sludge contains quantities of cobalt peroxide in addition to other metallic compounds. By means of this invention, the cobalt values of the anode sludge are resolubilized in new electrowinning solutions while at the same time the oxidizing properties thereof are utilized for the purification of the new cobalt electrowinning solutions. Upon treatment of a manganese-containing cobalt sulfate solution with the anode sludge from cobalt electrowinning processes, the manganese becomes oxidized to the tetravalent form and precipitates out of solution as manganese dioxide or hydrated forms thereof. The cobalt values in the anode sludge, presumed to be cobalt peroxides, are concurrently reduced and redissolved in the normally acidic cobalt sulfate solution. Thus, this invention not only provides a suitable means for the removal of manganese, but at the same time, in cooperation with the electrowinning step, provides for recovery of the cobalt values for reutilization in the electrowinning.

In the preparation of a purified cobalt solution, it is desirable that the cobalt values be in a form which is water soluble. To this end, the source of cobalt, which may be purification sludge from a manganese hydrometallurgical operation containing sulfides of cobalt and manganese as well as other impurities, is suitably treated to convert the mixed insoluble sulfides into mixed sulfates, as is well known to those skilled in the art, by roasting and extraction with dilute sulfuric acid. A relatively cool extraction dissolves most of the cobalt values while, as the extraction temperature is elevated, more manganese dissolves. After the preparation of a suitable solution of a cobalt salt as above described, purification thereof in accordance with this invention may then proceed. Suitable cobalt salts for treatment include the nitrates, chlorides and particularly the sulfates since, as above described, one of the most convenient sources of cobalt compounds is the mixed sludge of cobalt and manganese sulfides produced during purification of the electrolyte in the manganese electrowinning art. In general, it is desirable that the cobalt sulfate solutions be acidified with sufficient sulfuric acid or other suitable acid to yield a solution pH between pH 0.5 and pH 4.5. Ordinarily, this solution pH results from the extraction with dilute sulfuric acid to solubilize the cobalt values.

After formation of the acidic aqueous solution of the cobalt salt containing the manganese salt as a major impurity, the solution is then treated with a suitable oxidizing agent capable of converting manganese sulfate in aqueous solution to insoluble tetravalent manganese compounds such as manganese dioxide, but incapable of forming soluble permanganates under the treatment conditions. To this end, the acidic cobalt sulfate or other cobalt salt containing the manganese salt is treated in acidic aqueous solution with at least one oxidizing agent selected from the group consisting of the hypochlorites, peroxides and persulfates. Examples of suitable oxidizing agents include the hypochlorites, peroxides and persulfates of sodium, potassium, calcium and ammonium, such as calcium hypochlorite (bleaching powder), ammonium persulfate, hydrogen peroxide, sodium hypochlorite, potassium hypochlorite, sodium persulfate, potassium persulfate, sodium peroxide, calcium peroxide, and preferably, cobalt peroxide. Cobalt peroxide is preferred since it is generally available in the form of anode sludge from the cobalt electrowinning cells, and it introduces no anionic impurities into the cobalt solution. Furthermore, it is highly efficacious in the conversion of soluble manganese sulfate or other soluble divalent manganese compound into insoluble manganese dioxide. In general, a stoichiometric excess of cobalt peroxide or other suitable oxidizing agent is incorporated in the impure cobalt sulfate solution in order to insure complete precipitation of the manganese content thereof. The amount of oxidizing agent to be added is, of course, dependent on the manganese content of the cobalt solution to be purified. In general, an excess of 25 to 100%, based on manganese content, has been found preferable with a 50% excess approaching optimum. Employing an excess of oxidizing agent permits rapid and complete separation of the manganese content in insoluble form. If lesser quantities of oxidizing agent are employed than the optimum above set forth, then the rate of separation may be somewhat slower, while below a stoichiometric equivalent, based on the content of manganese, results in incomplete manganese removal.

While the removal of the manganese can be accomplished at atmospheric temperature or below, in general it has been found preferable to heat the treatment solution in order to hasten the precipitation of insoluble manganese. For example, heating to a temperature between 50° C. and the boiling point of the solution markedly accelerates the rate of oxidation, and preferably, the solution being treated is heated to a temperature between about 60° C. and 100° C.

The following examples illustrate how the invention may be carried out, but it is not limited thereto:

Example 1

An aqueous solution containing 29.32 grams per liter of cobalt and 2.84 grams per liter of manganese compounded as the sulfates, was treated with 1.0 and 1.25 equivalents of calcium hypochlorite, $CaOCl_2$, per equivalent of manganese, at room temperatures. The calcium hypochlorite was incorporated in the solution as a dry powder and the solution was maintained in a receptacle provided with means for agitating the contents thereof. Upon completion of the precipitation, the precipitate was filtered from the supernatant liquor, and both the solution and the precipitate analyzed for cobalt and manganese content. The following table summarizes the treatment conditions and results obtained:

|  | Test Nos. | | | |
| --- | --- | --- | --- | --- |
|  | 1 | 2 | 3 | 4 |
| Equivalent $CaOCl_2$ | 1.00 | 1.25 | 1.00 | 1.25 |
| Hours system stirred | 24 | 24 | 4 | 4 |
| Per cent manganese pptd | 79.2 | 99.4 | 82.6 | 98.1 |
| Per cent cobalt pptd | 1.6 | 2.8 | 1.6 | 3.1 |
| G/l. Mn in treated solution | 0.33 | 0.01 | 0.27 | 0.03 |

From the table it is apparent that a good separation was achieved.

Example 2

A dilute aqueous sulfuric acid solution was prepared containing 29.32 grams per liter of cobalt, 2.84 grams per liter of manganese, and sufficient sulfuric acid to yield a solution pH of pH 1.0. The receptacle of Example 1 was employed and was provided with heating and cooling means to maintain the solution temperature between 90° and 100° C. Thereupon, anode sludge from a prior cobalt electrowinning cycle was incorporated with the sulfate solution in an amount sufficient to provide 150 percent of the cobalt peroxide needed to precipitate the manganese. The anode sludge had been previously dried at 110° C. and aged for six months. After heating and stirring for four hours, the mixture was filtered to remove the precipitate and residual sludge and analyzed for manganese content. Only 0.54 gram per liter of manganese remained in the solution.

Example 3

The process of Example 2 was repeated employing fresh anode sludge from the anode of a cobalt electrowinning compartment cell, and the pH of the cobalt solution being treated was adjusted to pH 1.4 by partial neutralization with ammonium hydroxide. The treatment mixture was heated to 60° C. and upon completion of the precipitation, was cooled to room temperature and the cobalt solution filtered therefrom. It was found that the manganese content of the filtrate was substantially nil while very little cobalt losses were observed.

Example 4

An aqueous solution containing 29.32 grams per liter of cobalt, 2.84 grams per liter of manganese, and sufficient sulfuric acid to provide a pH of pH 1.5 was treated in the apparatus of Example 3 with sufficient ammonium persulfate to react with 1.5 times the quantity of manganese present. The solution was heated to 90° C. and after completion of the reaction and filtration of the mixture to remove the precipitate, the thus-purified cobalt solution was found to contain only 0.047 gram per liter of manganese. The resulting cobalt solution was well suited to electrowinning of cobalt, and upon the preparation of the usual fluoborate electrolyte known to those skilled in the art, excellent cobalt plates were secured.

From the foregoing, it will be seen that this invention provides a simple means for removing manganese from cobalt salt solutions. By the employment of the preferred treatment reagent, anode sludge from cobalt electrowinning cells, the cobalt peroxide content thereof is restored to a form suitable to recovery of its cobalt content while at the same time the cobalt solution is purified of its manganese content. Similar results are achieved employing ammonium persulfate as the oxidizing agent, and since this does not introduce undesirable anions into the cobalt solution, it can be employed for purification where cobalt electrowinning anode sludge is not available, for example, during the initial starting up of a cobalt electrowinning plant.

Since many apparently differing embodiments of the invention will occur to those skilled in the art, various changes can be made within the scope and spirit of the invention as herein disclosed without departing therefrom.

What is claimed is:

A process for production of a cobalt sulfate solution, adapted for cobalt electrowinning, from manganese purification sludge containing sulfides of cobalt and manganese, comprising converting the said metal sulfides of the sludge into sulfates, forming a dilute sulfuric acid solution of said metal sulfates having a pH between 0.5 and 4.5, admixing this solution with anode sludge containing cobalt peroxide from cobalt electrowinning thereby converting the manganese sulfate of said solution to insoluble compounds of manganese and the cobalt content of said anode sludge to soluble sulfates, and removing the resultant manganese-containing sludge from the thus purified cobalt sulfate enriched solution.

RUTH E. CHURCHWARD.
FRANCIS K. SHELTON.

REFERENCES CITED

The following references are of record in the file of this patent:

UNITED STATES PATENTS

| Number | Name | Date |
|---|---|---|
| 1,269,915 | Ellis et al. | June 18, 1918 |
| 1,276,739 | Ellis | Aug. 27, 1918 |
| 1,330,738 | Ellis et al. | Feb. 10, 1920 |
| 1,395,827 | Hybinette | Nov. 1, 1921 |
| 2,145,816 | Stoops | Jan. 31, 1939 |
| 2,476,284 | Churchward et al. | July 19, 1949 |

FOREIGN PATENTS

| Number | Country | Date |
|---|---|---|
| 516,657 | Great Britain | Jan. 8, 1940 |
| 4286 of 1926 | Australia | Oct. 15, 1926 |

OTHER REFERENCES

Mellor: Comprehensive Treatise on Inorganic and Theoretical Chemistry, vol. 12 (1932), page 414, vol. 14 (1935), pages 443, 510.

Churchward et al.: The Electrochemical Society, Reprint 85–10, April 17, 1944, page 117.